June 15, 1943.  A. R. SORENSEN  2,321,949
CUTTING APPARATUS
Filed April 20, 1942
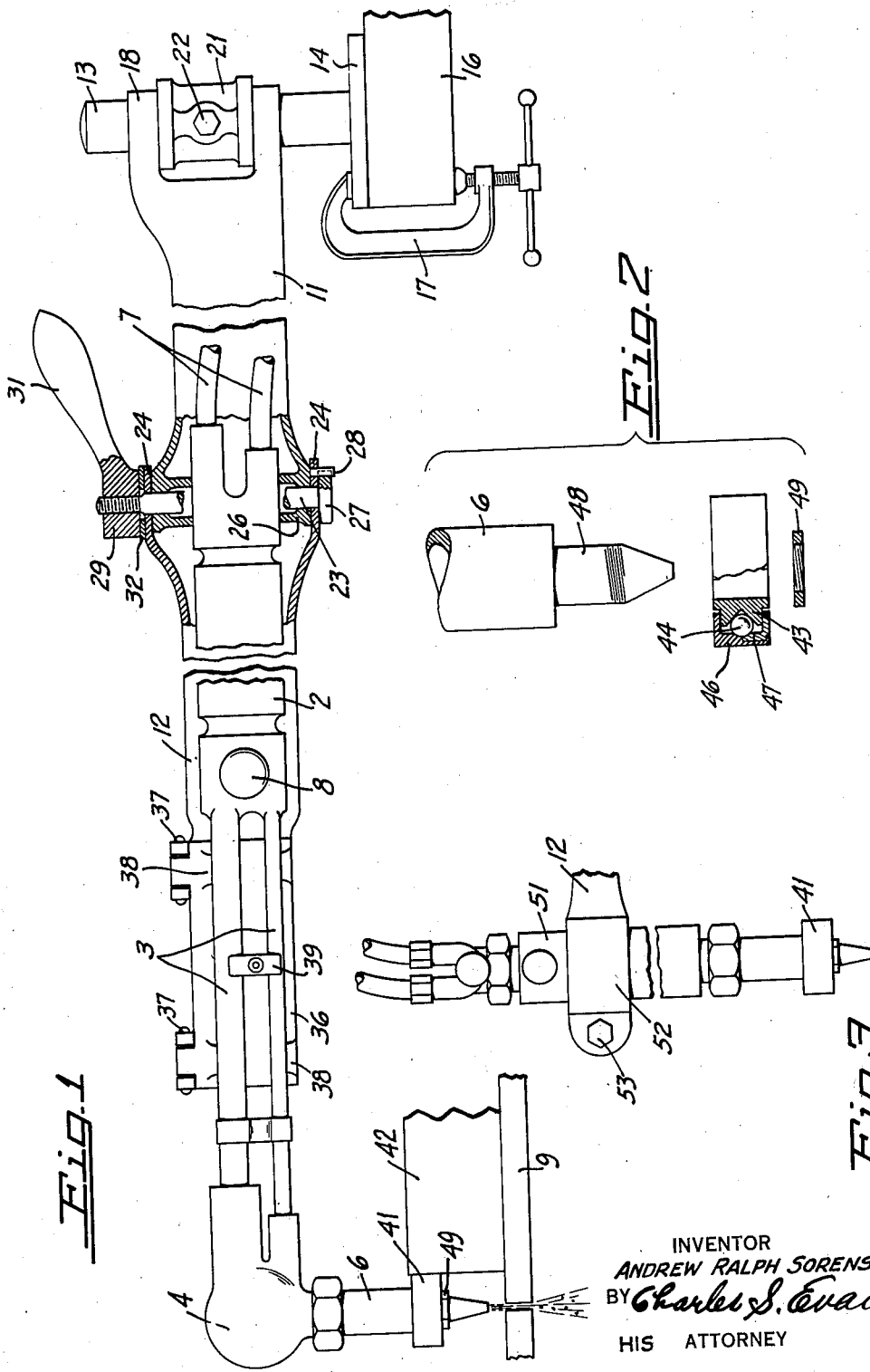
INVENTOR
ANDREW RALPH SORENSEN
BY Charles S. Evans
HIS ATTORNEY Patented June 15, 1943

2,321,949

UNITED STATES PATENT OFFICE 2,321,949

CUTTING APPARATUS

Andrew Ralph Sorensen, San Francisco, Calif.

Application April 20, 1942, Serial No. 439,784

4 Claims. (Cl. 266—23)

My invention relates to apparatus embodying a cutting torch for severing metallic sheets.

It is among the objects of my invention to provide means for directing a torch along a predetermined path across the material.

Other objects include the provision, in apparatus of the character described, of means for mounting the torch for movement in a plane parallel to the sheet material; of means for adjusting the torch toward and away from the material; and of guide means on the torch engageable with a template for directing the torch along the predetermined path.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a side elevational view of apparatus embodying the improvements of my invention; portions of the supporting arms being omitted to shorten the view, and other portions being broken away to illustrate the construction more clearly.

Figure 2 is a fragmentary exploded view on somewhat larger scale, showing the details of the guide wheel on the torch tip.

Figure 3 is another fragmentary view illustrating a modified construction in which the torch is held vertically on the end of a supporting arm.

When sheet material is to be severed with a cutting torch, it has been the practice to hold the torch in the hand as steadily as possible and follow a line marked on the sheet where it is to be cut. Under these conditions even a skilled workman with steady nerves cannot follow the line precisely, the inevitable result being that the cut sheet has uneven or wavy edges. Such work is objectionable and makes it difficult to fit parts together along abutting edges, not to mention the fact that the result is sloppy in appearance at best.

My improved apparatus overcomes this problem and enables a workman to cut a sheet leaving perfect edges, in accordance with any predetermined configuration, and with great facility and speed.

In terms of broad inclusion, my apparatus comprises a cutting torch, means for mounting the torch for movement in a plane parallel to a sheet to be cut, and means for directing the torch along a predetermined path across the sheet. The directing means preferably comprises a template, and guide means on the torch for engaging the template. Means are also preferably provided for adjusting the torch toward and away from the sheet.

In greater detail, and referring to Figures 1 and 2 of the drawing, my preferred apparatus comprises a cutting torch of ordinary construction having a handle portion 2 with pipes 3 terminating in a head 4 provided with an angularly disposed tip 6. The usual flexible ducts 7 are connected with the torch to supply the combustible gases for the flame, controlled by a valve having an adjusting knob 8.

Means are provided for mounting the torch for movement in a plane parallel to a sheet 9 to be cut. For this purpose a pair of pivotally connected arms 11 and 12 are arranged to overhang the material being worked on. Arm 11 is mounted on a fixed pivot preferably comprising a pin 13 projecting from a base plate 14. This plate may be held by any suitable means, as by fastening it to a support 16 by a C-clamp 17. The end of arm 11 terminates in a yoke 18 freely journaled on pin 13. If desired, ball bearings may be provided between the arm and pin. Adjustment of the arm axially of the fixed pivot is permitted by a block 21 lying between the yoke arms and secured to pin 13 by a set screw 22. Since most cutting is done with sheets lying flat, pin 13 is normally secured in vertical position.

The pivotal connection between the arms preferably comprises a pin 23 extending through ears 24 on arm 12 and through a hub 26 on arm 11. One end of the pin 23 has a head 27 held against turning by a small pin 28 on ear 24. The other end of pivot pin carries a nut 29 having a handle 31. Nut 29 is spaced from the other ear 24 of arm 12 by a washer 32. Normally the nut 29 is not turned up tight, but is left loose to allow free pivotal movement between the arms at the elbow. Such freedom is necessary in most cutting operations. If it is desired to cut a circle however, or an arc thereof, the nut is tightened to lock the arms together with the desired radius between the cutting end of the torch and the axis of the fixed pivot. Ears 24 have enough resilience to frictionally bear against the closely fitted hub 26 when the nut is tightened so as to effect the desired interlocking engagement.

The torch is preferably mounted on arm 12 by means of a hinge connection comprising a plate 36 connected to the upper edge of the arm by hinge pins 37 having an axis disposed at substantially right angles to that of the pivot pin 13. The weight of the torch thus keeps the hinge plate down in the normal working position. The torch is preferably fastened to the plate, between lugs 38, by a spring pressed latch 39 lying across pipes 3. By this latching arrangement the torch may be readily adjusted longitudinally of the arm or removed entirely. The advantage of the hinge mounting is that the tip of the torch may be swung up away from the work, without removing the torch from its supporting arm.

Means are further provided for directing the torch along a predetermined path across the sheet material 9. This is accomplished by guide means, preferably comprising a guide wheel 41 on torch tip 6, for engaging a template 42 overlying the work. As best shown in Figure 2, the guide wheel may conveniently comprise a hub ring 43 grooved to receive balls 44 and surrounded by an outer ring made up of two parts 46 and 47 to facilitate assembly. After assembly a flange on one of ring parts is spun or crimped over the edge of the other part to secure them together. Any ordinary ball bearing of proper size could be used, the outer race of which would then function as the rim of the guide wheel. Hub 43 of the guide wheel is fitted on reduced end 48 of tip 6, and is held in position by a nut 49.

Template 42 may be of any suitable material, such as metal, wood or fiber, and may be of any desired configuration depending upon the shape of piece to be cut out or off the parent sheet. Since the cutting flame is spaced from the template by the guide roller, it is obvious that the template must be designed accordingly to allow for this difference. Since the spacing is constant however no special difficulties are involved in making the template.

Figure 3 shows a modified construction for a torch 51 having a straight tip. In this case the end of arm 12 terminates in a split sleeve 52 clamped to the handle of the torch by a bolt 53. This mounting also permits vertical adjustment of the torch, and therefore the adjustment at the fixed pivot, first described, could be omitted.

I claim:

1. Cutting apparatus comprising a cutting torch, an arm, a fixed pivot for said arm, a second arm pivotally connected to the first arm, a plate hingeably connected to the second arm, and means for mounting the torch on the plate.

2. Cutting apparatus comprising a cutting torch, an arm, a fixed pivot for said arm, a second arm pivotally connected to the first arm, a plate hingeably connected to the second arm, and means for mounting the torch on the plate, said plate being hinged about an axis disposed at substantially right angles to the axis of said fixed pivot.

3. Cutting apparatus comprising a cutting torch, a movable arm, a pivot for said arm, a plate hingeably connected to the arm upon an axis substantially parallel thereto, and means for mounting the torch upon the plate.

4. Cutting apparatus comprising a cutting torch, a movable arm, a pivot for said arm, a plate hingeably connected to the arm upon an axis substantially parallel thereto, and means for detachably mounting the torch upon the plate in adjustable relation thereto.

ANDREW RALPH SORENSEN.